Dec. 21, 1943.    H. F. SCHMIDT    2,337,501
GEARING
Filed July 10, 1941    2 Sheets-Sheet 1

WITNESSES:
James K. Mosser
Andrew J. Cook

INVENTOR
HENRY F. SCHMIDT.
BY
A. B. Ruers
ATTORNEY

Dec. 21, 1943.   H. F. SCHMIDT   2,337,501
GEARING
Filed July 10, 1941   2 Sheets-Sheet 2
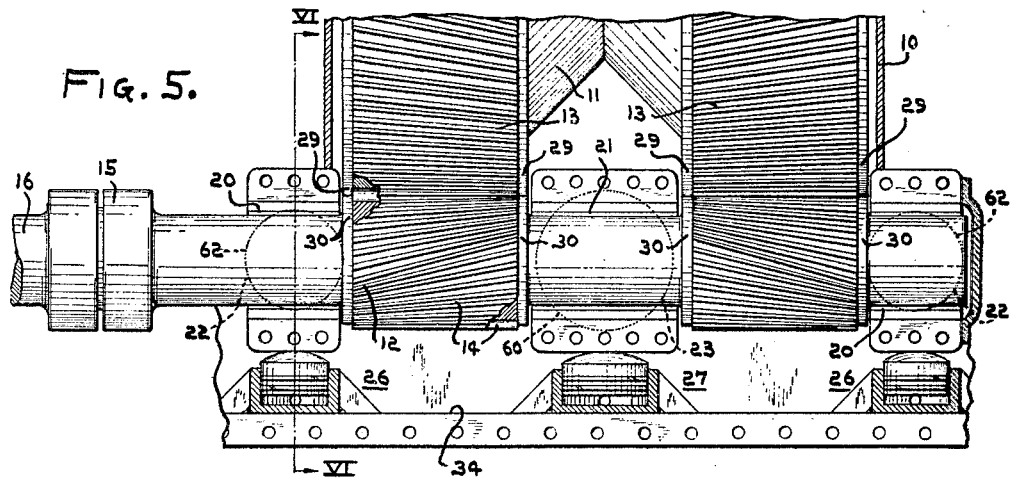
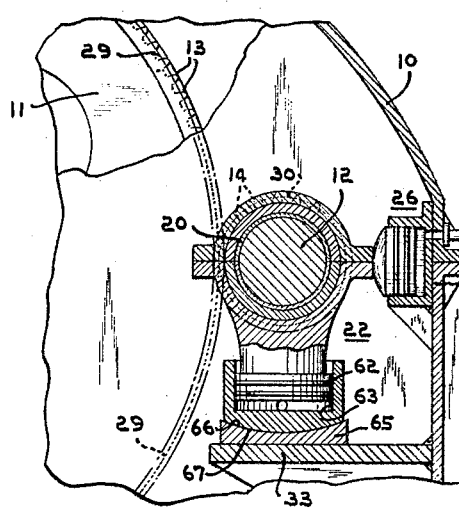
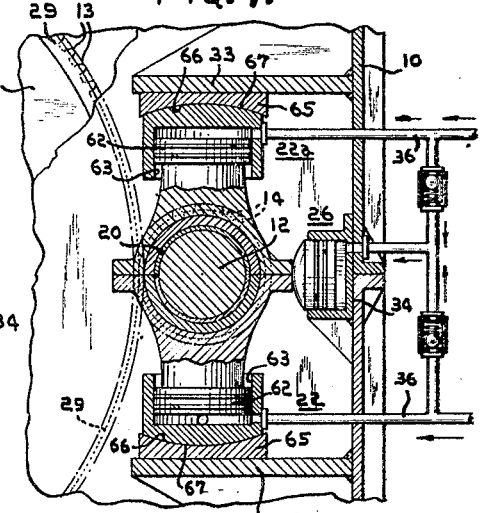
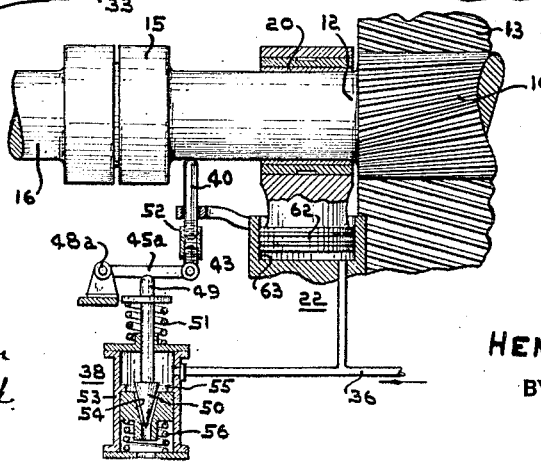
WITNESSES:
James K. Mosser
Andrew J. Cook
INVENTOR
HENRY F. SCHMIDT.
BY
A. B. Rems
ATTORNEY

UNITED STATES PATENT OFFICE 2,337,501

GEARING

Henry F. Schmidt, Lansdowne, Pa., assignor to Westinghouse Electric & Manufacturing Company, East Pittsburgh, Pa., a corporation of Pennsylvania Application July 10, 1941, Serial No. 401,697

7 Claims. (Cl. 74—410)

The invention relates to gearing, more particularly to reduction gearing for the transmission of large powers, and it has for an object to provide a pinion meshing with a gear and supported so that it is free to float to accommodate itself to the gear.

A further object of the invention is to provide a pinion meshing with a gear and having independent and unrestrained floating movement.

A further object of the invention is to support the bearings for a pinion meshing with a gear so that failure of lubrication or undue bearing wear will not disturb the distribution of load along the teeth.

In the ordinary marine reduction gear, the torsional stiffness of the pinion is very much less than that of the gear because the pinion diameter is very much less. If the pinion is to transmit power with its teeth uniformly loaded, torsional deflection must be taken into account, as pointed out in my Patent No. 1,849,696, March 15, 1932. If a pinion were restrained at one end and torque applied at the other end, then the torsional deflection would be truly helical and proper meshing of the pinion teeth with the gear teeth could be effected merely by tilting the pinion; however, as the restraint or load acts in a distributed manner along the pinion teeth, torsional deflection becomes larger at an increasing rate toward the torque or coupling end, that is, the deformation is approximately parabolic, and, to compensate for the departure of torsional deflection from a true helix, it is necessary to provide for bending of the pinion sufficient to correct for the departure of torsional deflection from a true helix so far as the meshing pinion tooth or teeth are concerned. In said patent, as the pinion is carried by a floating frame, the latter is constructed and arranged to permit of the pinion being bent for this purpose; and, as the slight bending is not restricted to the pinion, but necessarily involves the pinion and the frame as an aggregate, it is obvious that maintenance of an accurate bearing relation between the pinion and the frame is essential. In accordance with the present invention, instead of the pinion being carried by a frame, it is directly supported by hydraulic means so that it is free to float unrestrained by other structure, such as a frame, and the hydraulic means is constructed and arranged to apply a bending moment to the pinion to correct the departure of torsional deflection from a true helix. Accordingly, a further object of the invention is to provide a pinion directly supported by hydraulic means, the latter being constructed and arranged to apply a bending moment to the pinion so as to correct for departure of torsional deflection from a true helix.

In said patent, as well as in Westinghouse Patents Nos. 1,088,387, 1,136,072, 1,136,189 and 1,195,119, it is old to have a pinion carried by a floating frame with the latter supported by hydraulic means. In these structures, the frame and the pinion constitute a floating aggregate, and, as already pointed out, maintenance of the correct pinion and frame bearing relation is important. On the other hand, in accordance with the present invention, the frame is omitted and the hydraulic means is associated directly with independent bearings for the pinion, whereby the pinion is free to float independently and the bearing problem is avoided for the reason that the hydraulic means causes each of the bearings to engage the pinion journals in proper relation, irrespective of wear or other cause which would seriously interfere with continued or desired operation with the floating frame type. Therefore, a further object of the invention is to provide a gear wherein the pinion is supported directly by hydraulic means to provide for independent floating movement thereof so that it may accommodate itself to the gear member.

A further object of the invention is to provide apparatus of the character described with means for maintaining alignment of the driving and pinion members.

These and other objects are effected by the invention as will be apparent from the following description and claims taken in accordance with the accompanying drawings, forming a part of this application, in which:

Fig. 5 is a plan view showing a modified way of maintaining the pinion and gear center distance;

Fig. 6 is a sectional view taken along the line VI—VI of Fig. 5;

Fig. 7 is a detail sectional view of a reversible arrangement with hydraulic means to maintain the center distance; and Fig. 8 is a view showing modified gauge mechanism.

Figures 1, 2, 3, 4:
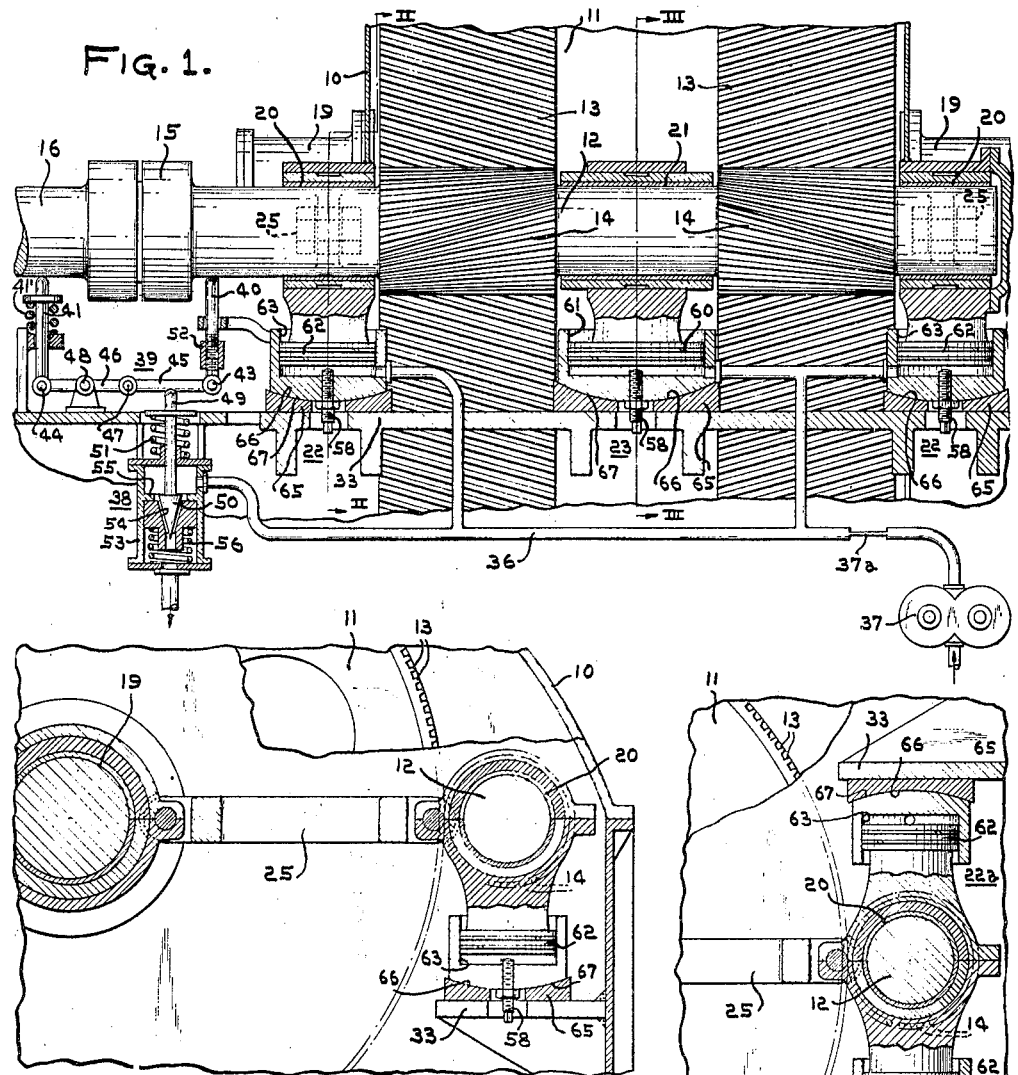
Fig. 1 is a longitudinal sectional view in the vertical plane of the pinion.
Fig. 2 is a transverse sectional view taken along the line II—II of Fig. 1.
Fig. 3 is a view taken along the line III—III of Fig. 1 and showing a preferred pinion middle bearing arrangement.
Fig. 4 is a view similar to Fig. 2 but showing an arrangement providing for operation in both directions.

Referring to the drawings more in detail, there is shown a reduction gear including a housing or frame 10 supporting a gear 11 and a pinion 12 in meshing relation. Preferably, the gear and the pinion have opposed rows of helical teeth 13, 13 and 14, 14, respectively. A coupling 15 connects the pinion to a prime mover shaft 16 and the gear is connected to a propeller or driven shaft (not shown).

The casing 10 has bearings 19 for the gear and the pinion is carried by end bearings 20 and preferably also by a middle bearing 21. The bearings 20 and 21 are separate and independent and are supported from the casing by hydraulic means disposed so as to oppose tangential gear forces and to permit of independent floating or tilting movement of the pinion to divide the load between the rows of meshing teeth.

If the gear is unidirectional, as shown in Figs. 1, 2 and 3, the hydraulic means may be comprised by hydraulic devices at 22 and 23 disposed at one side of the pinion, the devices at 22 and 23 supporting the end bearings 20 and the middle bearing 21, respectively. On the other hand, if reversibility is required, then, as shown in Fig. 4, hydraulic devices at 22a are disposed at the other side of the pinion.

Radial gear forces are opposed by any suitable means resisting separation of the pinion and the gear. This purpose is served in Figs. 1, 2 and 4 by links 25 connecting the pinion end bearings 20 and the gear bearings 19. Where the pinion has a middle bearing 21, the latter may be backed up by a hydraulic device at 26 (Fig. 3). In Figs. 5 and 6, hydraulic devices at 26 and 27 cooperate with the middle and end bearings 21 and 20, respectively, to resist radial gear forces; and, to prevent undesired inward movement of the pinion relatively to the gear, the gear and pinion having engaging shrouds 29 and 30 whose diameters are equal to the pitch circle diameters of the gear and pinion, respectively, to provide for true rolling engagement.

The hydraulic devices at 22, 23, 26 and 27 are similar in that each comprises piston and cylinder elements, one of the elements being in direct supporting relation with respect to a bearing and the other being carried by the gear casing. As the hydraulic device at 22, 22a and 23 oppose tangential gear forces and as the devices at 26 and 27 oppose radial gear forces, it is sufficient to provide the gear casing with suitably positioned abutment surfaces for the cylinders of the hydraulic devices permitting of movement of the latter therealong to suit the bearings, whereby manufacture and assembly are facilitated. Accordingly, therefore, the casing has supporting shelves 33 for the tangentially acting devices and a supporting wall 34 for the radially acting devices.

The cylinders of the hydraulic devices are furnished with fluid under pressure from a conduit 36 supplied by a pump 37, preferably through an orifice 37a. Preferably, a valve at 38 controls the escape of fluid from the conduit so that the fluid pressure is caused to vary with the load transmitted by the gear in consequence of which the pinion is supported by the hydraulic means in equilibrium with tangential gear forces.

As shown in Fig. 1, the valve at 38 is controlled for the purpose mentioned by gauge mechanism at 39, the latter including feeler rods 40 and 41 cooperating with portions of the pinion and of the driving shaft adjacent to the coupling 15. The lower ends of the rods are pivotally connected at 43 and 44 to the outer ends of a compound lever comprising lever elements 45 and 46 pivotally connected at 47. A foundation or reference fulcrum 48, preferably carried by the gear casing, supports the lever element 46 at a point between the pivotal connections 44 and 47 and the lever element 45 abuts the outer end of the stem 49 connected to the movable valve member 50 of the valve at 38. A spring 51 cooperates with the stem to bias the valve in an opening direction to the extent permitted by the lever element 45, upward movement of the latter permitting the valve to open wider to the extent thereof and downward movement of the lever resulting in movement of the valve in a closing direction. Any suitable means may be used to prevent the valve-opening spring 51 from tilting the pivotally-connected lever parts 45 and 46 about the pivotal connection 47. For example, a spring 41' associated with the feeler rod 41 serves this purpose.

The feeler rod element 40 includes means, for example, a turnbuckle 52, providing for adjustment of its length. With the gear in operation and fluid under pressure being supplied to the hydraulic devices, if the turnbuckle 52 is adjusted, the length of the rod element 40 is thereby varied and the valve at 38 is, in consequence, adjusted to vary the fluid pressure and the pinion is moved tangentially, the pinion being so moved until alignment thereof with the driving shaft 16 is secured.

After alignment of the driving shaft and pinion is effected by adjustment of the gauge mechanism, the alignment is automatically maintained. If the driving shaft should move downwardly in Fig. 1, the gauge mechanism would be operated to adjust the valve at 38 to cause the pinion to follow the driving shaft. Tendency of the pinion to move tangentially due to change in load is opposed by change in fluid pressure in the proper direction.

Assuming that the gear is in operation and that the load should change, such change causes a very slight movement of the pinion tangentially and the feeler element 40 moves to adjust the valve at 38 to provide fluid pressure to balance the tangential gear force.

So far as the operation of changing the fluid pressure to suit the change in load is concerned, it will be noted that, of the gauge mechanism at 39, only the elements 40 and 45 move, the pivotal connection 47 serving as a fulcrum for the lever element 45. Therefore, in Fig. 8, there is shown a simplified construction where the lever element 45a has one end carried by the reference point or foundation fulcrum 48a and the other end is pivotally connected at 43 to the feeler rod 40.

The lever elements 45 and 46 of the gauge mechanism may be arranged to multiply motion of the control valve at 38 any desired amount to obtain any required sensitivity of control of positions of the pinion relatively to the driving shaft.

The valve at 38 preferably comprises a body 53 providing a chamber in communication with the conduit 36. A valve seat 54 is arranged within the body, the seat preferably being pressed against a shoulder 55 by a spring 56 in order to prevent damage in the event of its being engaged by the movable valve member 50 with severe impact or high pressure.

While the pistons of the hydraulic devices at 22 and 23, in Fig. 1, are normally supported by fluid under pressure, means are preferably also provided to support the pinion bearings in the event of failure of the fluid supply. To this end, the cylinders of the hydraulic devices are equipped with screws 58 normally defining small clearances with respect to the pistons and adapted to contact with the latter to support the bearings should the pressure of fluid fail. With the pinion 12 aligned with the driving shaft 16, the screws 58 of the hydraulic pressure devices at 22 and 23 are adjusted until they contact with the pistons of the devices and then each screw is backed off a small amount. It will be apparent, therefore, that in the event of failure of fluid pressure, the pinion as a whole will move through the slight clearance distance and proper engagement thereof with the gear will be maintained.

As the pinion 12 has a diameter relatively much smaller than that of the gear 11, its torsional stiffness is very much less and torsional deflection should be taken into account if distribution of load along the meshing teeth is to be maintained. In order that the hydraulic device at 23 for the middle bearing 21 may be in balance with the hydraulic devices at 22 for the end bearings, so far as the pinion is concerned, it is necessary that the piston and the cylinder 60 and 61, respectively, of the hydraulic device at 23 shall have a diameter twice that of the piston 62 and cylinder 63 of one of the devices at 22. The piston 60 and the cylinder 61 for the middle bearing have a diameter which is enough larger than twice the diameter of a piston 62 and cylinder 63 to apply a bending moment to the pinion sufficient to correct for departure of torsional deflection from a true helix. The action taking place, so far as a meshing pinion tooth is concerned, may be visualized as a parabolic curvature of the tooth in the tangent plane due to torsional deflection and which curvature is compensated for by bending of the pinion so that the helical extent of the tooth is preserved.

To provide for distributed bearing of the hydraulic devices on the wall 34 and the shelves 33, while preserving the proper relation of such devices with respect to the pinion bearings would entail very accurate design and machining of the supporting wall 34 and the shelf 33. To simplify this problem and facilitate manufacture and assembly, shoes 65 are provided, the shoes having recesses 66 for the spherical ends 67 of the cylinders of the hydraulic devices.

From the foregoing, it will be apparent that, by having independent bearings for the pinion, with hydraulic means for supporting the bearings, the pinion is free to float unencumbered by other structure so that it may accommodate itself to the gear with the load divided between the rows of meshing teeth. The floating function is secured directly, rather than indirectly, where the pinion is carried by a frame, the requirement of the bearings of the latter type of construction to maintain the positional relation of the pinion and frame involving possible failure of the gear in the event of failure of any bearing. On the other hand, with the improved arrangement, a bearing failure can have no such result, as such a bearing would be moved to proper position in relation to other bearings by its hydraulic device. The hydraulic means not only independently supports the pinion bearings in equilibrium with tangential gear forces at different loads, but it also includes means facilitating alignment of the pinion and driving shaft, this being particularly desirable to simplify gear manufacture and assembly as it is unnecessary to provide for alignment incident thereto. Due to the fact that the pinion bearings are independently supported by hydraulic devices, the latter may be so arranged as to apply a bending moment to the pinion sufficient to correct substantially for departure of torsional deflection from a true helix due to the load transmitted.

While the invention has been shown in several forms, it will be obvious to those skilled in the art that it is not so limited, but is susceptible of various other changes and modifications without departing from the spirit thereof, and it is desired, therefore, that only such limitations shall be placed thereupon as are specifically set forth in appended claims.

What is claimed is:

1. In a gear, a gear member, a pinion member having end and intermediate journal portions, bearings for supporting the gear and pinion members in meshing relation and the pinion member bearings cooperating with said journal portions, said pinion member bearings being separate and independent so as to be relatively displaceable in directions normal to the pinion member axis, hydraulic devices for the respective pinion member bearings and including pressure-responsive abutment elements for directly supporting the latter so as to resist tangential gear forces imposed thereon, means providing fluid under pressure for the hydraulic devices, the pressure area of the intermediate abutment element being larger than the sum of the areas of the end abutment elements to provide for the application of a bending moment to the pinion member sufficient to correct for departure of torsional deflection of the pinion member from a true helix.

2. In a gear, a toothed gear member, a toothed pinion member meshing with the gear member and having a plurality of journal portions, a casing supporting the gear member, bearings for the pinion member bearings and including pressure-being separate and independent so as to be capable of relative displacement in directions normal to the pinion member axis, hydraulic devices cooperating with the respective bearings for supporting the latter by liquid under pressure so as to oppose tangential gear forces, means providing a space in communication with each of said devices, means providing for the maintenance of liquid under pressure in said space and including an escape valve movable in a closing direction to increase the pressure and vice versa, and valve controlling means directly engaging a desired region along the pinion member and operative in response to movement of the region in the direction of the gear tangential force to move the valve in a closing direction to restrict the escape of liquid and thereby increase the liquid pressure in said space.

3. In a gear, a toothed gear member, a toothed pinion member meshing with the gear member and having a plurality of journal portions, a casing supporting the gear member, bearings for the pinion member journal portions, said bearings being separate and independent so as to be capable of relative displacement in directions normal to the pinion member axis, hydraulic devices cooperating with the respective bearings for supporting the latter by liquid under pressure so as to oppose tangential gear forces, each of said devices including a cylinder element and a piston element defining a pressure chamber and disposed so that the cylinder axis extends in the direction of the tangential gear force, the piston element of each device being attached to the associated bearing so as to support the latter, means provided internally of the gear casing for supporting the cylinder elements, means providing a space in communication with each of said chambers, means providing for the maintenance of liquid under pressure in said space and chambers and including an escape valve movable in a closing direction to increase the pressure and vice versa, and valve controlling means cooperating directly with a desired region along the pinion member and operative in response to movement of the region in the direction of the tangential gear force to move the valve in a closing direction to restrict the escape of liquid and thereby increase the liquid pressure in said space and chambers.

4. In a gear, a toothed gear member, a toothed pinion member meshing with the gear member and having a plurality of journal portions, a casing supporting the gear member, bearings for the pinion member journal portions, said bearings being separate and independent so as to be capable of relative displacement in directions normal to the pinion member axis, hydraulic devices cooperating with the respective bearings for supporting the latter by liquid under pressure so as to oppose tangential gear forces, each of said devices including a cylinder element and a piston element defining a pressure chamber and disposed so that the cylinder axis extends in the direction of the tangential gear force, the piston element of each device being attached to the associated bearing so as to support the latter, means provided internally of the gear casing for supporting the cylinder elements, means providing a space in communication with each of said chambers, and means providing for the maintenance in said space and chambers of liquid under pressure dependent upon the load transmitted by the gear, said last-named means comprising a valve controlling the escape of liquid from said space and mechanism including a feeler rod engaging directly a portion of the pinion member to move the valve in a closing direction upon movement of said region in the direction of the tangential gear force.

5. The combination as claimed in claim 4 with screws carried by and extending axially of the cylinders and normally defining small clearances with respect to the pistons so as to provide positive support for the pinion member bearings in the event of failure of liquid pressure.

6. The combination as claimed in claim 4 with soleplates carried by the supporting means and having spherical sockets and the cylinders having spherical ends fitting the sockets.

7. The combination as claimed in claim 4 wherein the feeler rod is provided with means for adjusting its length so as to vary the operating position of the portion of the pinion member engaged thereby.

HENRY F. SCHMIDT.

CERTIFICATE OF CORRECTION.

Patent No. 2,337,501. December 21, 1943.

HENRY F. SCHMIDT.

It is hereby certified that error appears in the printed specification of the above numbered patent requiring correction as follows: Page 3, second column, line 43, claim 2, after "pinion member" strike out "bearings and including pressure-" and insert instead -- journal portions, said bearings --; and that the said Letters Patent should be read with this correction therein that the same may conform to the record of the case in the Patent Office.

Signed and sealed this 15th day of February, A. D. 1944.

(Seal)

Henry Van Arsdale,
Acting Commissioner of Patents.